Patented May 7, 1935

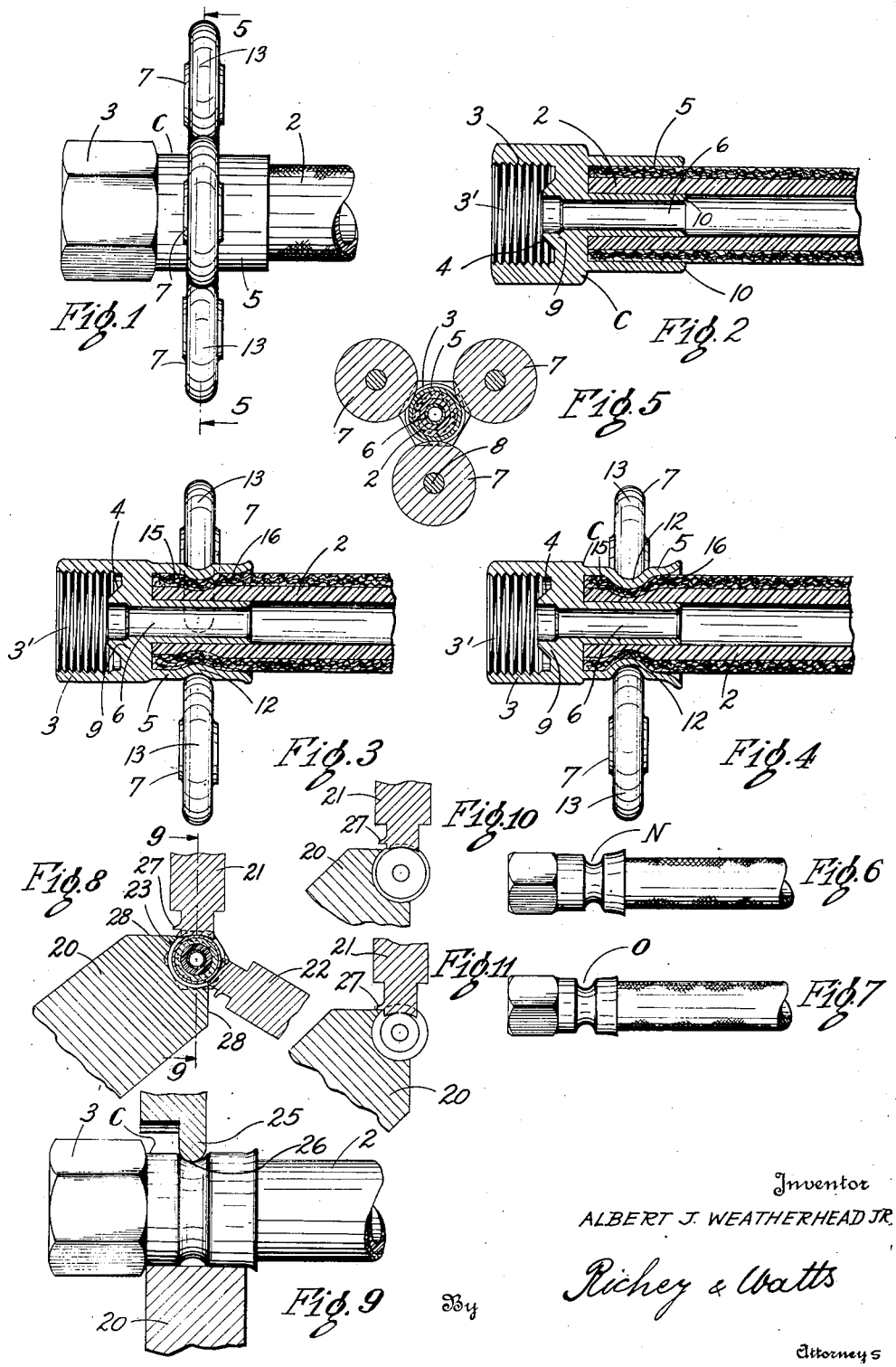

2,000,680

UNITED STATES PATENT OFFICE 2,000,680

HOSE COUPLING

Albert J. Weatherhead, Jr., Cleveland, Ohio, assignor to The Weatherhead Company, Cleveland, Ohio, a corporation of Ohio Application December 18, 1931, Serial No. 581,893

6 Claims. (Cl. 29—88.2)

This invention relates to a hose coupling and the method of making same. It has to do more particularly with a method of affixing a metallic coupling member to a non-metallic hose.

It will be appreciated that where a metallic coupling is joined to a non-metallic or composition hose, there is a possibility that if the parts are not securely joined leakage or separation of the parts will occur under high fluid pressures such as developed in a hydraulic braking system. It will also be appreciated that where the hose is in curvature and the body thereof is bent sharply across the end of the coupling and fabric of the hose will be worn due to bodily movements or oscillations of the hose with respect to the coupling.

As a result of my novel method of affixing a coupling member to a hose I produce a finished unit that is leak proof at the joint and wherein the end of the coupling is flared outwardly away from the hose to reduce the wear above described to a minimum.

By my method, the above desiderata, namely affixing of the coupling to the hose and the flaring of the end thereof may be brought about by one single operation which makes for the rapid production of the units as well as a substantial lowering of the manufacturing costs. This may be accomplished by either rolling or spinning wherein a radially directed pressure is applied to the coupling sleeve to deform the metal of the sleeve inwardly toward the nipple to effect a gripping of the hose therebetween. This radial force is effective to produce a flare or "bell mouth" at the open end of the sleeve. The diameter of the bell mouth with respect to the diameter of the coupling sleeve is dependent upon a number of variable factors, such as the diameter and thickness of the coupling part deformed and the distance from the end of the coupling to the point of application of the deforming pressure. The method employed to deform the sleeve also affects the amount of flare produced by the deformation.

It is among the objects of this invention to join a hose to a coupling member in a manner that is economical and expeditious and wherein a bond will be effected that will be leak proof and will resist to a maximum forces tending to separate the hose and coupling, while at the same time and in the same operation a flare or bell mouth is produced. A further object of the invention is to provide a method wherein the end of a coupling sleeve is flared, a hose member is compressed between the sleeve and the nipple of the coupling, and the body of the hose between the last mentioned compressed portion is forced against the radial wall of the coupling between the nipple and the sleeve portion in a single operation. Another object of the invention is to reduce a number of steps necessary to produce a finished unit. Another object is to provide a method of joining a hose to a coupling so as to produce an extremely durable connection between the hose and coupling and to reduce wear in the finished unit between hose and coupling.

Other objects and advantages and economies of manufacture will become apparent from the following detailed description and the accompanying drawing wherein like characters of reference designate like parts and wherein:

Figure 1 is a plan view of a coupling and a hose in assembled relation and arranged within a mechanism designed to join the parts by rolling;

Figure 2 is a longitudinal section through the coupling and hose prior to the rolling or spinning operations;

Figure 3 is a view similar to Figure 1 with a coupling and hose in longitudinal section showing the relation of the parts at the commencement of the rolling operation;

Figure 4 is a view similar to that of Figure 3 showing the coupling and the hose at the termination of the rolling operation;

Figure 5 is a section taken on the line 5—5 of Figure 1;

Figure 6 is a detail of a coupling and a hose wherein the metal is displaced immediately adjacent the free end of the coupling;

Figure 7 is a view similar to Figure 6 wherein the deformation of the coupling occurs at a point equi-distant from the ends of the coupling sleeve;

Figure 8 is a vertical section of the spinning mechanism employed to join the hose and the coupling;

Figure 9 is an elevation partly in section of the spinning mechanism shown in Figure 8;

Figures 10 and 11 are detail sectional showings of successive steps in the spinning operation.

With reference to the drawing I have shown in Figure 2 a coupling member 1 and hose 2 that are mounted in assembled relation. The coupling is similar to that shown and described in my Patent No. 1,733,925 and includes a chamfered head 3 threaded as at 3' having a conical seat 4 formed on the radial wall as constituting the bottom of the chamber. The threaded portion of the coupling in adapted to co-operate with a pipe or other conduit (not shown) and securely hold the flared end of said pipe against the seat 4 in accordance with the precepts and teaching of the patent above identified.

The coupling in this instance differs over the coupling of the patent above referred to in that the integral sleeve 5 is unthreaded and has a finished periphery against which radial force may be directed to offset a portion thereof inwardly toward an elongated nipple 6 integral with the radial wall portion 9. The inner surface of the sleeve 5 is intended to encompass the cut end of the hose 2 and the internal walls of the hose in turn encompass the nipple 6.

Since the hose is to be gripped between the outer sleeve and the nipple, the nipple preferably should have substantially the same axial extent as the sleeve to permit the hose to be gripped thereagainst at any point along the longitudinal axis of the sleeve. Both the sleeve and the nipple may be rounded or chamfered at their outer ends as at 10 to remove any tendency on the part thereof to gouge into the hose when the body of the hose is turned at an angle with respect to the longitudinal axis of the sleeve. The efficacy of this is particularly advantageous with regard to the nipple, whereas the sleeve may be flared away from the hose in the finished unit.

According to my invention the metallic fitting and the non-metallic or flexible hose member may be joined to each other by various methods. The joint, however, is one which may be easily affected by rolling or spinning. The apparatus for rolling the internally protuberant pressure rib on the sleeve 5 to grip the hose 2 against the nipple is shown in Figures 1 and 5 and comprises in this instance three working rolls 7 which are rounded or convexed at their peripheries as at 13. The rolls are shown as spaced at about 120° with respect to each other, although it is to be understood that rolls which vary with respect to each other in outside diameter or vary in their angular relation with respect to each other may be employed. The rolls 7 are rotatably mounted on shafts 8 carried by suitable apparatus for simultaneously moving the same toward a common center which, in this instance, is the longitudinal axis of the hose coupling. The mechanism to effect this movement of the rolls toward the common center and a chuck to effect a rotation of the coupling are not shown since they will be familiar to those skilled in the art.

If a relatively wide flare or bell mouth is desired on the sleeve the rolls 7 are positioned to engage the periphery of the sleeve 5 at a point adjacent the open end thereof. Where it is desired to reduce the flare or bell mouth effect by rolling, the sleeve is fed farther into the rolls so that contact is established along a circumferential line spaced considerably from the open end of the sleeve. With the parts positioned to effect the desired flare the rolls 7 are progressively moved inwardly toward a common center defined by the longitudinal axis of the rotating coupling until the convexed periphery of each roll has produced the protuberant rib 12 as illustrated in Figures 3 and 4.

The pressure thus applied to the sleeve displaces the metal circumferentially inwardly which results in the compression of the hose material along a circumferential line on the outer surface of the nipple 6 thereby affixing the coupling to the hose. The bond between the coupling and the hose is supplemented by the longitudinal movement of that portion of the hose between the rib 12 and the radial wall of the coupling part 9. It will be appreciated that the longitudinal pressure on this portion identified as 15 causes it to seal the cut end of the hose against the wall of the coupling. The compression of the hose within this annular chamber prevents any fluid which might enter this chamber from the nipple from entering the fabric portion of the hose and escaping therethrough. Simultaneously with the above operation which produces the rib 12 and the compression of the hose part 15 and as a result of the radially applied force, the outer end of the sleeve is flared outwardly from the unsecured portion of the hose.

As hereinbefore mentioned it is equally expeditious to join the coupling of the hose by spinning and I have shown in Figures 8 and 9 a form of apparatus for carrying out the step. The spinning apparatus comprises primarily a steady-rest 20 and a pair of spinning rolls 21 and 22 and a mechanism (not shown) for supporting and moving the spinning tools 21, 22 inwardly toward a common center. The steady-rest 20 consists of a relatively massive body portion having a work receiving pocket 23 formed in the end thereof. As shown in Figure 8 the pocket is arcuate in form to receive and support the outer cylindrical wall of the coupling sleeve. The coupling is positioned in the rest 20 with the head of the coupling against the side of the rest to prevent longitudinal movement of the coupling in one direction. While so positioned the spinning tools 21 and 22 are progressively advanced toward the common center, the axis of the coupling member. The tools 21 and 22 are provided with projections 27 to limit the inward movement of the tools and thus limit the size of the rib 12. In the spinning operation as in the rolling operation the amount or effect of the flare produced during the deformation of the sleeve is dependent upon the position of the rib 12 with respect to the outer end of the sleeve.

During the formation of the rib 12 it will be understood that the diameter reduction resulting from the radially applied force effects an increase in the lineal length or an elongation of the sleeve. The amount of elongation is related to the radially applied force, the shape of the rolls or spinning tools and other factors.

It will be apparent to those skilled in the art that the method of affixing the coupling to the hose may be varied within certain limits without departing from the spirit and scope of my invention and I therefore do not wish to be limited other than by the claims appended thereto.

I claim:

1. A method of securing a flexible hose of non-metallic material in a metallic coupling having an internal nipple and an integral external sleeve for engaging the inner and outer surfaces of the hose respectively, which consists in inserting the hose into the sleeve so that the nipple embraces the inner surface of the hose and thereafter applying radial pressure to the sleeve in the zone behind the end of the sleeve to deform the metal of the sleeve inwardly, to grip the hose against the nipple, while simultaneously elongating said sleeve and flaring a portion thereof.

2. A method of securing a flexible hose of non-metallic material in a metallic coupling having an internal nipple and an integrally formed external sleeve for engaging the inner and outer surfaces of the hose respectively, which consists in inserting the hose into the sleeve so that the nipple contacts with the inner surface of the hose and thereafter applying a uniform pressure by means of a plurality of rolls to the sleeve in the zone behind the end thereof and behind the end of the nipple to compress the material of the hose against the nipple while simultaneously flaring the outer end of the sleeve away from the unsecured portion of the hose.

3. A method of securing a non-metallic hose in a metallic coupling having a substantially smooth internal nipple, a radial wall and an integrally formed external sleeve for engaging the inner and outer surface of the hose respectively, which consists in inserting the hose into the sleeve and over the nipple and thereafter spinning an internally protuberant rib in the metal of the sleeve while simultaneously elongating and flaring a portion of the sleeve and compressing the hose material against the internal nipple.

4. A method of securing a non-metallic hose in a metallic coupling having an internal nipple and an integral external sleeve and a radial wall, which consists in inserting the hose into the sleeve and over the nipple and into engagement with the wall and thereafter spinning an internal protuberant rib in the metal of the sleeve while simultaneously elongating the sleeve and flaring the end portion thereof outwardly and away from the hose, compressing the hose material against the nipple and expanding the same on one side of the zone of pressure.

5. A method of securing a non-metallic hose in a metallic coupling which comprises a member having an integral sleeve, a radial wall and an internal nipple projecting from said wall which consists in inserting the hose into the sleeve and over the nipple and thereafter changing the length of the sleeve while reducing the diameter at one point and increasing the diameter of the end portion of the sleeve and simultaneously exerting a longitudinal pressure on the radial wall.

6. A method of securing a flexible hose of non-metallic material in a metallic coupling having an internal nipple, a radial wall and an external sleeve formed integrally with said radial wall which consists in inserting the hose into the sleeve so that the nipple embraces the inner surface of the hose and the radial wall engages the end of the hose and thereafter applying radial pressure to the sleeve in the zone behind the end of the sleeve to deform the metal of the sleeve inwardly to grip the hose against the nipple and to compress the material of the hose against said radial wall, while simultaneously elongating said sleeve and flaring a portion thereof.

ALBERT J. WEATHERHEAD, Jr.